Dec. 21, 1943.   J. OPIE   2,337,406
HAM PRESSING AND PACKAGING DEVICE
Filed July 3, 1941   6 Sheets-Sheet 1
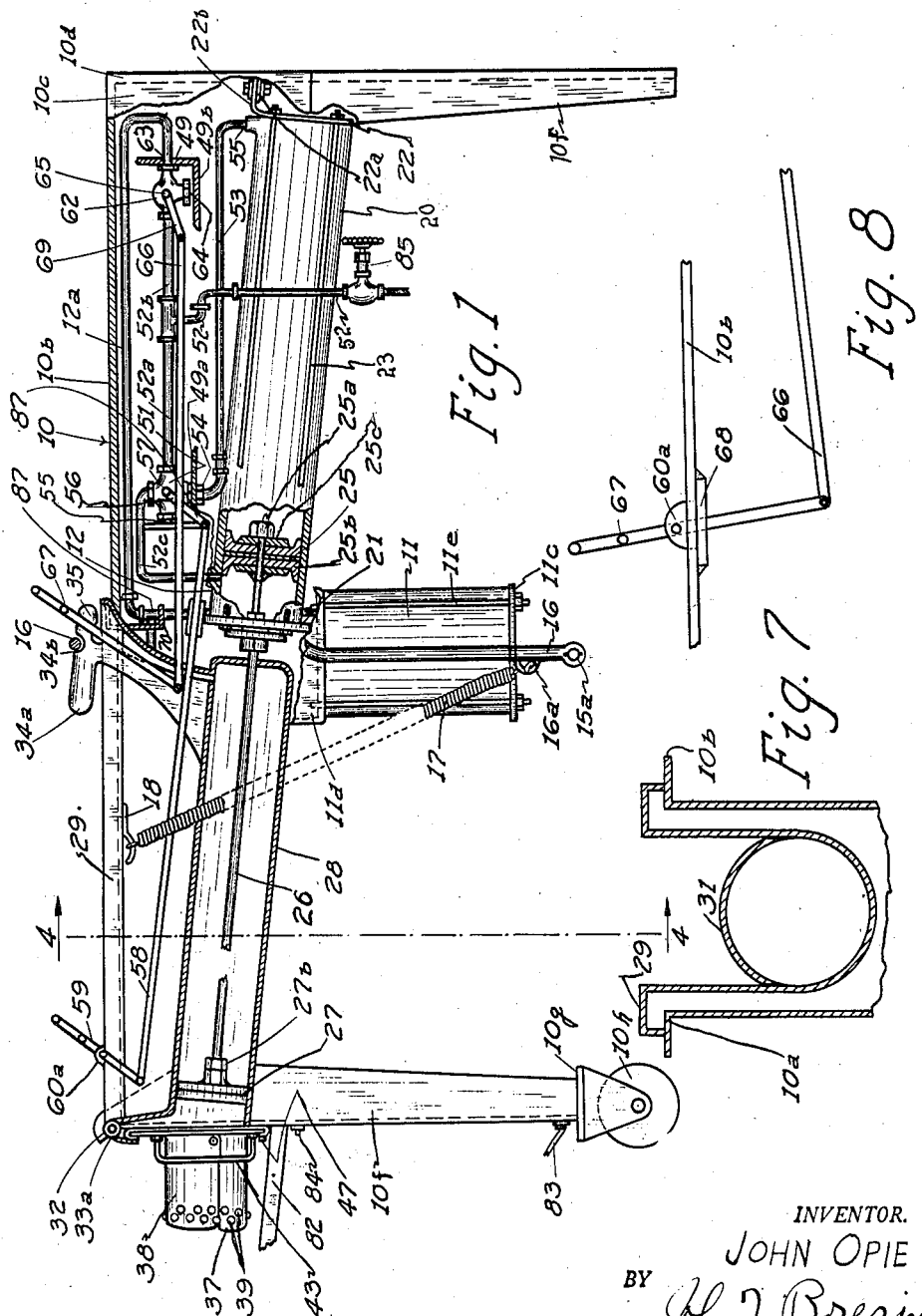
INVENTOR.
JOHN OPIE
BY John F. Brezina Dec. 21, 1943.                J. OPIE                2,337,406
              HAM PRESSING AND PACKAGING DEVICE
                  Filed July 3, 1941        6 Sheets-Sheet 2
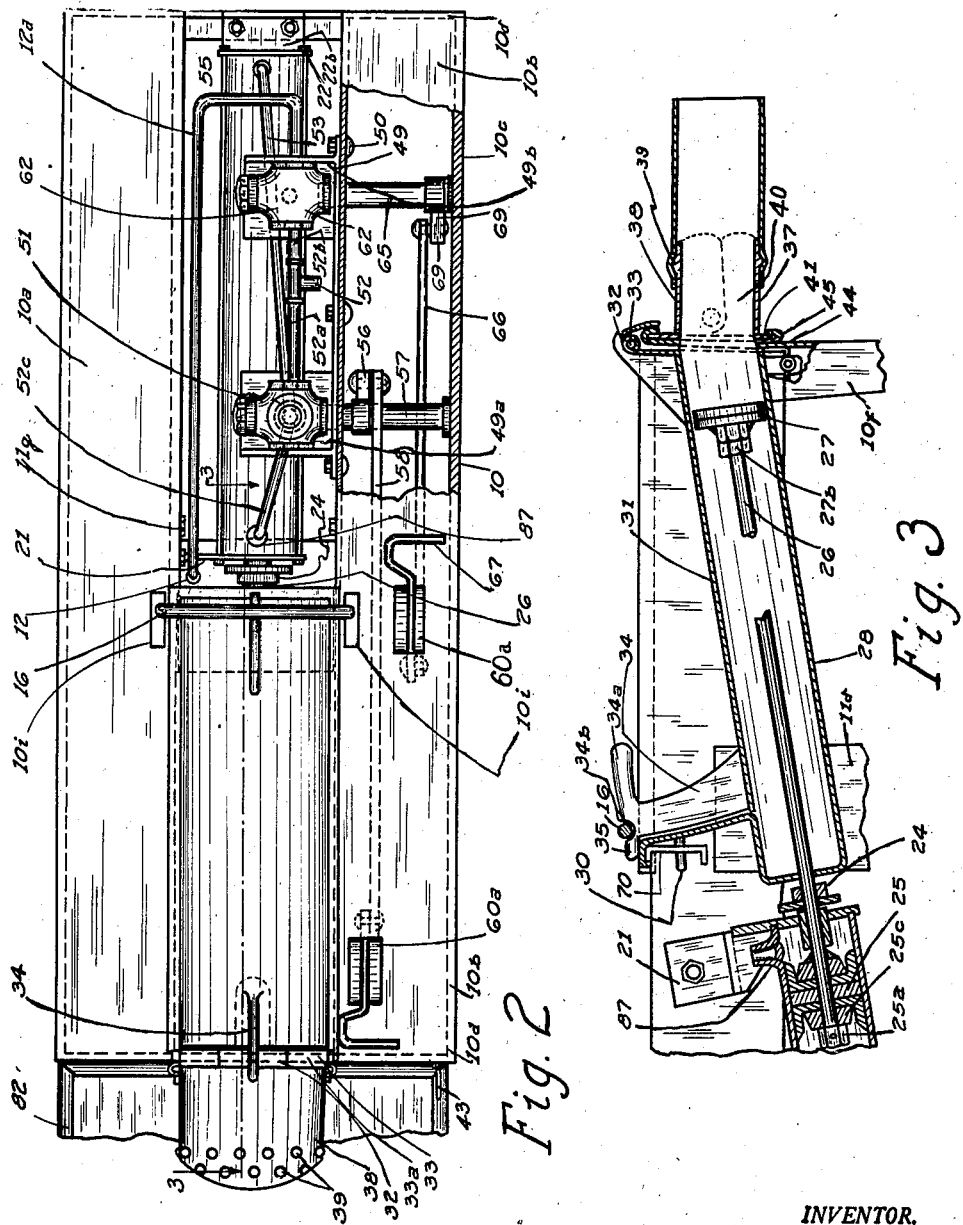
INVENTOR.
JOHN OPIE
BY John F. Brezina Dec. 21, 1943.  J. OPIE  2,337,406
HAM PRESSING AND PACKAGING DEVICE
Filed July 3, 1941  6 Sheets-Sheet 3
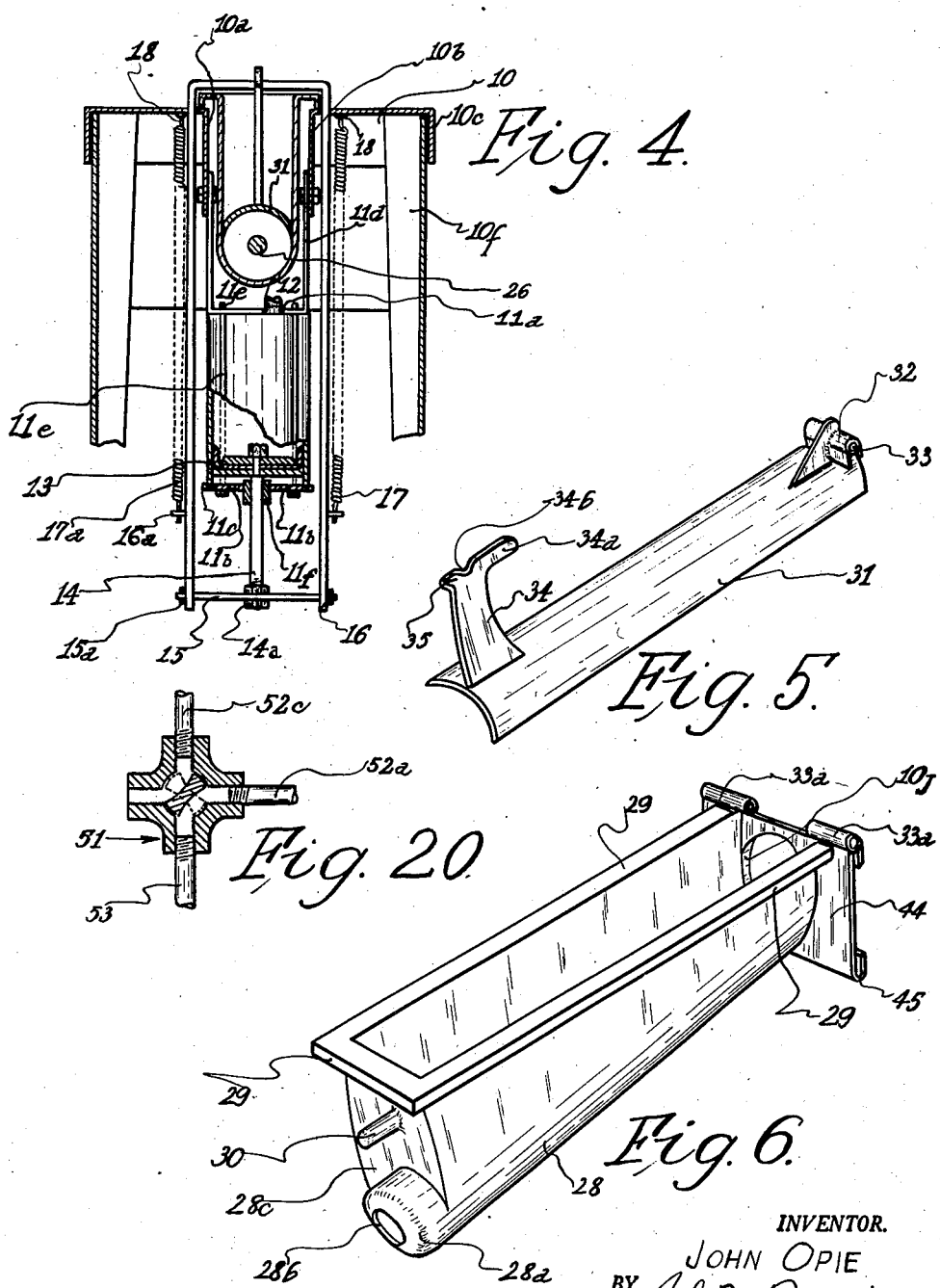
INVENTOR.
JOHN OPIE
BY John F. Brezina
ATTORNEY Dec. 21, 1943.         J. OPIE         2,337,406
HAM PRESSING AND PACKAGING DEVICE
Filed July 3, 1941       6 Sheets-Sheet 4

INVENTOR.
JOHN OPIE
BY John F Brezina
ATTORNEY.

Dec. 21, 1943.   J. OPIE   2,337,406
HAM PRESSING AND PACKAGING DEVICE
Filed July 3, 1941   6 Sheets-Sheet 5
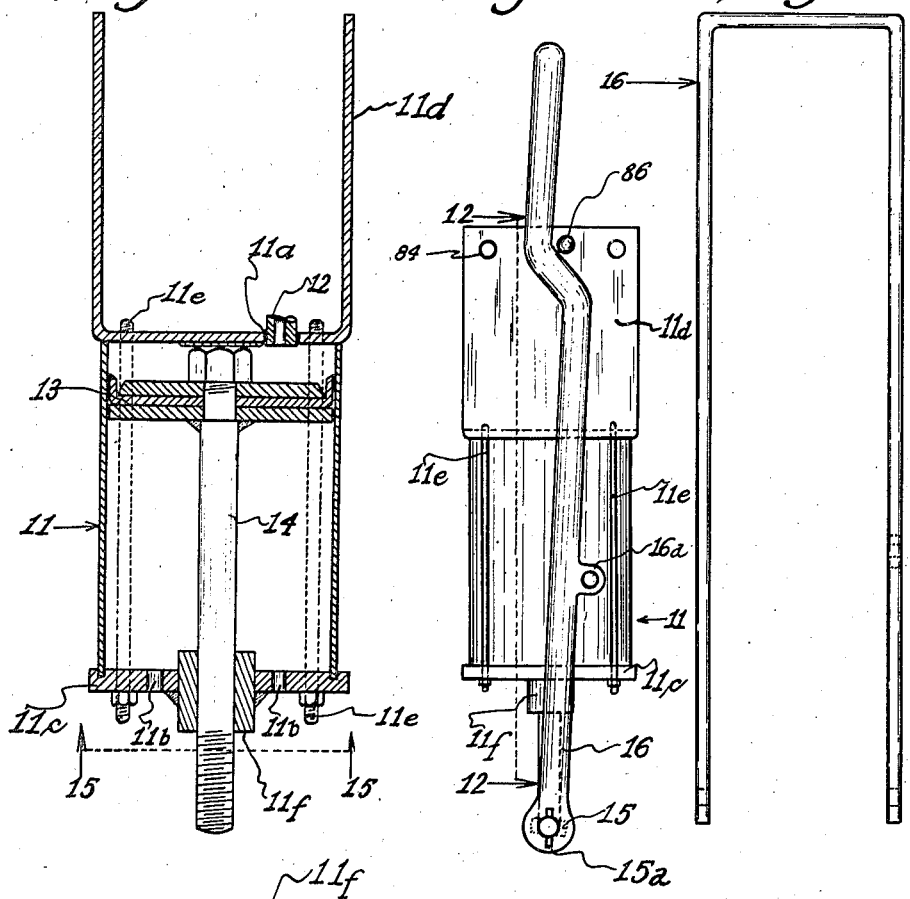
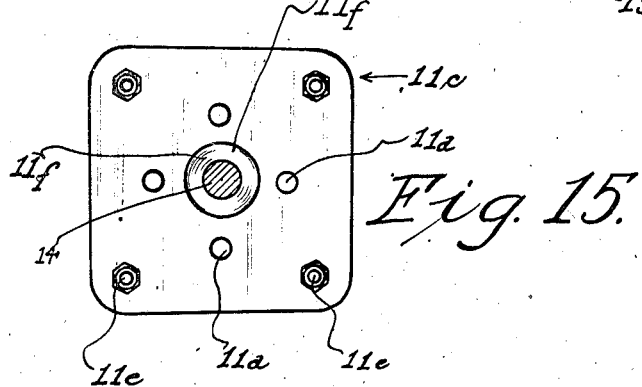
INVENTOR.
JOHN OPIE
BY John F. Brezina
ATTORNEY.

Dec. 21, 1943.　　　　　J. OPIE　　　　　2,337,406
HAM PRESSING AND PACKAGING DEVICE
Filed July 3, 1941　　　　6 Sheets-Sheet 6

INVENTOR.
JOHN OPIE
BY John F. Brezina

Patented Dec. 21, 1943

2,337,406

UNITED STATES PATENT OFFICE 2,337,406

HAM PRESSING AND PACKAGING DEVICE

John Opie, Chicago, Ill.

Application July 3, 1941, Serial No. 400,922

12 Claims. (Cl. 226—101)

My invention is directed to ham presses and devices of the type adapted to press a meat body into the desired form, and to eject the same in a pressed-together state, and to insert the same into a casing, container or receptacle made of whatever material.

It is an important object of this invention to provide a device for pressing hams, and for ejecting the pressed ham and pushing same within a suitable casing, or receptacle which casing, or receptacle, is adapted to be suitably gripped by portions of the device which are actuated to function by the outward movement of the formed and pressed-together meat body.

It is a further object of my invention to provide an economical and practical ham press device adapted for use in connection with meat or other food products, which includes means and mechanism for first pressing the meat or other food body into the desired shape, and manually controllable mechanism for moving the pressed-together meat or food body outwardly and into and within suitable meat casings or receptacles.

It is a further object of my invention to provide manually controllable means and mechanism for moving and projecting meat or food bodies of desired shape, and cooperating casing or container gripping devices, which are mounted in a position to be operated by outward movement of the meat body and to simultaneously cause relatively firm gripping and holding of suitable coverings, casings, or containers in which the meat or food bodies are to be marketed.

A further object of my invention is to provide a meat and food press which includes manually controlled power operated or compressed air operated devices for pressing the meat or food body into the desired shape, and also manually controllable or manually actuable mechanism for moving the formed meat or food body out from the press, and into and within the confines of a suitable covering or casing, in which the edible product is to be marketed.

A further object of my invention is the provision of the aforedescribed means and mechanisms associated in a practical machine or apparatus in such a manner that a single operator can selectively and successively operate the same either through mechanical or similar methods, and which embodies novel and advantageous structural features permitting relatively easy cleaning of the various parts and their maintenance in a sanitary condition.

Other and further important objects of my invention will be apparent from the following description and appended claims.

On the drawings:

Fig. 1 is an elevational view of my device with the foremost legs and side parts of the table broken away and taken on a vertical plane indicated by I—I of Fig. 2.

Fig. 2 is a top plan view of the device with the removable work surface panels removed and with parts broken away to show underlying structure.

Fig. 3 is an enlarged fragmentary cross sectional view taken on a vertical plane of the pressing and ejection cylinder and associated mechanism and substantially on the line 3—3 of Fig. 2.

Fig. 4 is a cross-sectional view taken along the line 4—4 of Fig. 1.

Fig. 5 is a perspective view of the shaped end preferably substantially semi-cylindrical compression plate or trough cover hereinafter more specifically described.

Fig. 6 is a perspective view of the trough hereinafter more fully and specifically described.

Fig. 7 is a fragmentary cross-sectional view taken substantially on a vertical and perpendicular plane of Fig. 6 and also showing fragments of the table structure.

Fig. 8 is a partially side elevational and partially cross-sectional view taken on line VIII—VIII of Fig. 2 and showing one of the manually operable air valve levers as mounted to extend through the table surface.

Fig. 12 is a view showing the vertical cylinder in vertical cross section and showing the U-shaped mounting bracket which supports it in end elevation.

Fig. 13 is a side elevational view of the vertical cylinder and illustrating one side portion of the bail.

Fig. 14 is an elevational view of the bail removed as a separate unit.

Fig. 15 is a bottom view looking upwardly at the bottom of Fig. 12 and showing the bottom surface of the cylinder end member and piston rod projecting therethrough.

Fig. 20 is a schematic view of a conventional four-way valve, and illustrating the type of valve control employed and hereinafter more fully described.

As shown on the drawings:

Figure 16:
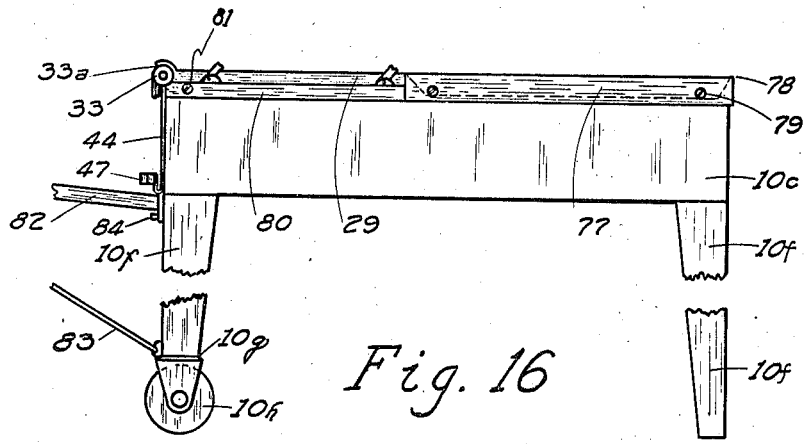
Fig. 16 is a side elevational view with parts broken away of the device with the top aprons or work panels mounted thereon, and with the end shelf, end brace and legs partially broken away, and with the outlet spout unit removed.
Figure 17:
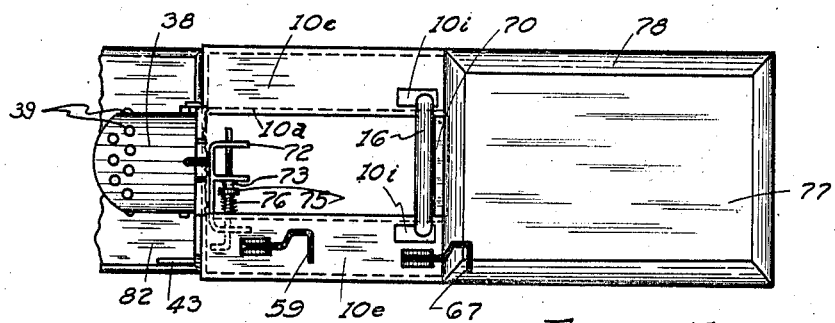
Fig. 17 is a top plan view on a reduced scale of the pressing device or machine and showing the trough member and attached parts illustrated in Fig. 9 removed from the machine, and showing a fragment of the end shelf, the two top work panels on the left hand end of the machine being removed.

The numeral 10 designates a frame support or table which, as particularly shown in Figs. 16 and 17 is centrally recessed throughout its length. Said table structure includes the two longitudinal flat metal top strips 10a and 10b and longitudinal depending side aprons 10c and depending metal end aprons 10d. Said table has a plurality, preferably two of substantially flat peripherally flanged work panels 10e shown in Figs. 16 and 17, forming work areas or work platform surfaces above the operating parts of the device. Numerals 10f designate suitable supporting legs or standards which are suitably secured i. e., by welding at their upper ends to the corner joined metal aprons 10d of the table body or frame.

As indicated in Figs. 1, 4, and 16, the two legs 10f at the discharge end of the device are preferably provided with caster wheels or rollers 10h journalled in suitable frames 10g which are secured by welding or the like to the lower ends of said two legs 10f respectively.

Centrally disposed in the metal top strips 10a and 10b are a pair of parallel apertures or preferably elongated openings indicated by the numeral 10i to permit movement of pivoted bail or link or connection levers hereinafter described longitudinally of the device.

Figures 18, 19:
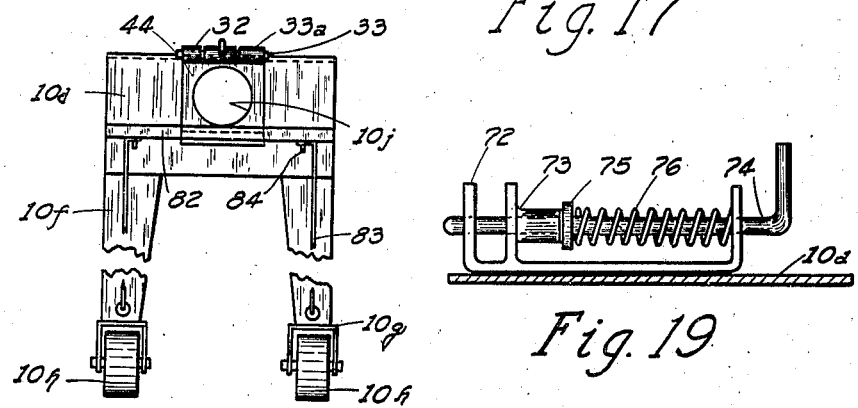
Fig. 18 is an end elevation looking at the left end of Fig. 16 and showing fragments of the leg broken away.
Fig. 19 is an enlarged top elevational view of the locking device shown also in Fig. 17, and adapted to releasably lock the trough unit of Fig. 9 into the machine.

As shown on the drawings, some of the working and operative parts of the device extend angularly upward from the foot of the support or table 10 at such an angle that the discharge end of the device designated in Fig. 18 as 10j is preferably substantially at or adjacent the level of the table top. Said discharge opening is defined by the edges of a relatively large rounded recess formed in end apron 10d shown in Figs. 1 and 18.

I will first describe the mechanism and means adapted to press a mass of inserted meat or other food material into an elongated body, that is, the means for applying pressure against the side surfaces of the inserted mass as distinguished from the ends thereof.

Beginning at the lower end of the device and extending vertically upward, as shown, and referring particularly to Figs. 1, 4, 12, and 13, is a cylinder indicated by the numeral 11, the upper end plate of which is provided with air port 11a. The lower end plate has a plurality of air ports 11b. Air port 11a is communicated by suitable fittings and connected air conduits 12 and 12a with control valve 62. Said air conduits are composed of a plurality of sections and suitable pipe fittings and are connected to a control valve hereafter described.

Referring to Figs. 1 and 12, said cylinder 11 is preferably composed of a cylindrical sleeve and apertured sealing end plate 11c, which is held in sealing engagement against the lower end of said cylinder sleeve by a plurality of bolts 11e. The upper end of cylinder 11 is sealed against the flat lower portion of supporting U-shaped bracket 11d whose ends are bolted to lower depending ends of inner integral flanges of top strips 10a and 10b as shown in Fig. 4. Bolts 11e thread into threaded apertures in the horizontal part of bracket 11d.

Cylinder 11 is accordingly provided with an air inlet and exhaust opening 11a in the upper end in communication with the connected air conduit 12. A piston 13, rigidly connected to a piston rod 14, is slidably mounted in cylinder 11, this piston rod extending exteriorly of cylinder 11 through a gland 11f in cylinder end wall or plate 11c. Piston rod 14 is threaded at its outer lower end, as shown, to receive lock nuts 14a which adjustably connect and secure the cross arm 15. Both extremities of cross arm 15 are reduced and bored to receive cotter pins 15a as shown to provide for hinged and movable mounting of the apertured lower ends of a preferably U-shaped link or bail indicated by numeral 16. Apertured ears 16a are formed integrally on bail 16 as shown in Figs. 1 and 4. One or more relatively long coil springs 17 and 17a, (two being shown in Fig. 4), have one end of each thereof attached to ears 16a of bail 16. The upper end of each of said springs 17 and 17a is connected to anchoring elements 18 which are in turn secured by welding or the like on under surfaces respectively of top strips 10a and 10b as illustrated in Fig 4. Said springs effect return upward movement to piston 13 to effect upward and partially horizontal movement to bail 16 when air pressure above said piston has been released. Said pivotal movement of bail 16 is effected by slidable engagement of the intermediate offset portions of bail 16 with horizontally extending studs 86 secured on the outer side surfaces of bracket 19 engaging the offset intermediate portions of bail 16. Said studs are shown in Fig. 13.

Said bail 16 is adapted to press downward the pressure plate or element which presses the sides of a mass of meat or other material into either cylindrical, substantially rectangular or other desired shape, the operation of which will hereinafter be more fully described.

The said cylinder 11 is therefore mounted in depending position from metal mounting bracket 19.

THE EJECTION AND HORIZONTALLY DIRECTED PRESSURE MEANS

Reference numeral 20 designates a metal cylinder which has opposite apertured end caps or plates 21 and 22 which are held in sealing engagement with the cylinder sleeve by four tie rods 23. The end plate 22, at the right of Figs. 1 and 2, has an apertured angular bent extension which provides a mounting bracket 22a. Said mounting bracket 22a is secured by suitable bolts to a correspondingly apertured inward extension or flange 22b mounted by welding or the like to the inner surface of the end apron 10d of the table structure as shown at the right of Figs. 1 and 2.

The forward end of said cylinder 20 has a central passage and a suitable gland or stuffing box 24 mounted thereon, as shown in Figs. 1 and 2.

Enclosed within the cylinder 20 is a piston 25 rigidly attached to a piston rod 26 which extends longitudinally in the cylinder 20, and which is guided in longitudinal movement by the stuffing box or gland 24, and which piston extends outwardly therefrom to reciprocate in the manner hereinafter described.

As shown in the central portion of Fig. 1, the piston 25 is preferably composed of a metal disc or washer and two cup-like members 25b of leather or the like positioned in opposite directions so that their respective peripheries will closely hug the inner surfaces of the cylinder 20 and be also held thereagainst by the aid of the compressed air within the cylinder on whichever side of said piston said compressed air exists. Each of said cup-like members are held in position by adjacent metal washers 25c, the forwardmost of said washers being held by an annular flange 25d and the rearmost of said washers 25c being held by a suitable nut 25a threaded on the end of the piston rod 26.

Rigidly mounted on the end of rod 26 and carried thereby is an annular pusher head or plunger 27, which is of a size slightly less than the diameter of the trough hereinafter described. Said plunger 27, is composed of two disks of suitable size and threaded on end of piston rod 26, and secured by a lock nut 27b. The size of said plunger, as well as of the size of the removable chute and pressure plate may be changed easily in the same machine to adapt it to different size hams. The plunger head 27 slides on and reciprocates on the inner surface of the trough.

Piston rod 26 is slidably mounted in gland 24, and when projected from cylinder 20, is supported through sliding engagement of plunger 27 with the concave-like surface of the trough 28 hereinafter more fully described. As shown in Fig. 6, the end of said trough is provided with a longitudinally extending substantially cylindrical portion 28a which has a central bore 28b in its end through which bore piston rod 26 slides.

Figure 9:
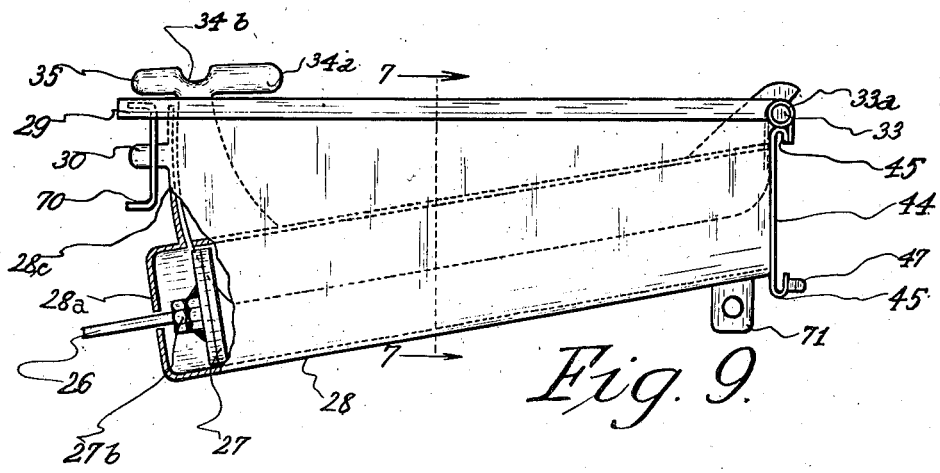
Fig. 9 is a partially cross-sectional view and partially a side elevation of the compression trough removed from the machine, though showing in side elevation a portion of the slidable plunger and a portion of the piston rod connected thereto.

Referring to Figs. 6 and 9 numeral 28 indicates the trough, the bottom-most portion of which is shaped throughout its length to conform to the particular shape of food body desired to be formed. In the illustration of the drawings (see Figs. 6 and 9) said trough is semi-circular in cross section, though said trough may assume other shapes.

The deeper end of trough 28 is closed by the end wall 28c, this end closure or end wall extending approximately at right angles to the bottom of said trough. The outlet end of trough 28 is open, as shown, to communicate with the discharge end of the device.

As will be noted, particularly in Figs. 6 and 9, said trough 28 is formed so that it is gradually shallower at its discharge end. Said trough 28 has its upper edges along three sides thereof bent horizontally and downwardly to form integral flanges 29 whose lower edges rest upon the upper surfaces of top strips 10a and 10b of the table structure, and additionally prevent any undesirable exposed metal edges at the working surfaces.

Said trough is provided at its deeper end with a perpendicularly extending stud 30 shown in Fig. 6 which is adapted to engage a suitable bracket to thereby remove or anchor said trough in position in the device.

THE PRESSURE COVER OR PLATE

The numeral 31 indicates the pressure or compression plate or trough cover which is of concave-convex or other form to accord with the shape of the food body to be formed. As particularly shown in Fig. 5, said compression plate in the preferred form is substantially semi-circular in transverse cross-section. Mounted substantially adjacent the outlet end of the trough cover 31 is the passaged male hinge knuckle 32, said hinge knuckle being transversely bored to receive a hinge pin 33 whereby said pressure plate is hingedly mounted to cooperating spaced hinge knuckles 33a which are mounted by welding or the like to the upper ends of trough 28 as shown in Figs. 1, 3, 5, 9 and 16. Pintle or hinge pin 33 is removably mounted in hinge knuckle 32 and in hinge knuckles 33a to permit quick removal of said pressure plate.

As shown in Figs. 3, 5 and 9, there is mounted at the forwardmost end of the trough cover and relatively centrally thereof, an upwardly protruding member 34 provided with an integral handle 34a, and recessed as at 34b to receive and to releasably engage the connection link or bail 16 herein described.

The springs 17 and 17a extend angularly upward and in inclined direction toward the discharge end of the device. Said springs 17 and 17a normally exert a pull on pivotal bail 16 to position the upper end of said bail above and upon recess 34b of member 34. When lowered by action of piston 13 from upper position, the depending arms of said bail portions are preferably offset as shown in Fig. 13 and upon descent, the upper end of said bail will engage said recess and pull down the compression cover 31 when air-actuated movement of piston 13 takes place. When the operator desires to tilt up the compression cover 31 to permit the operator to insert a mass of meat or the like into the compression chamber, the decompressed air above piston 13 is exhausted and springs 17 and 17a pull bail 16 up and the bail is pivoted to the left of Figs. 1 and 2 by slidable engagement thereof with studs 36 to thereupon permit complete manual swinging over of the pivoted compression cover or plate 31 on its defined hinge mounting.

DISCHARGE PORTION OF DEVICE

The discharge or outlet end of the machine, as illustrated in Figs. 1, 2, 3, and 10, includes a spout-like device similar to that shown and described in my co-pending patent application, Serial No. 376,977. Said device is not a necessary part of this machine as it may be omitted when the pressed meat bodies are not to be encased within casings or covering receptacles. The use of said spout device is highly desirable when the pressed body is to be pushed into a casing or container. Said spout device, preferably, though not necessarily, comprises a substantially semi-cylindrical lower spout portion indicated by numeral 37 and a hinged arcuate shaped upper spout portion or hood 38, each of said spout and hood preferably having outwardly projecting friction members 39 formed thereon to frictionally engage and to irregularly expand a portion of an open end of a casing when said casing is being filled with the pressed food body. Friction members 39 are preferably formed by pressing outwardly spaced apart portions of the hood and of the spout respectively, as for example by means of a suitable blunt die. The lateral edges of said hood 38 normally overlap spout 37 and said hood is pivotally mounted by means of two bolts passing therethrough and at diametrically opposite sides and into apertures (not shown) of an integral collar 40 which is formed integral with a slidable mounting plate 41 shown in elevation in Fig. 10. Said collar defines a rounded opening 42 of sufficient size so that any usual ham may pass therethrough.

The substantially rectangular mounting plate 41 is provided with a suitable bail-like handle 43 by means of which it is slid horizontally into and out of discharging position. Mounting plate 41 carries an outwardly bent stop flange as shown at the left of Fig. 10 to limit the movement of said plate in one direction.

Figure 10:
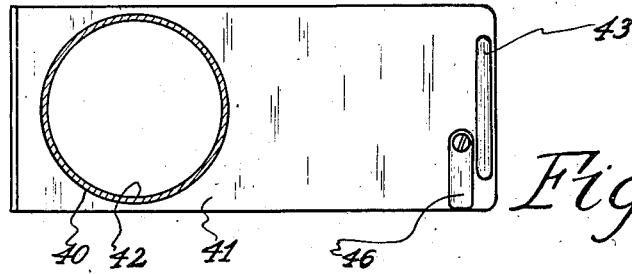
Fig. 10 is an elevational view of the slidable end plate which is normally slidably mounted at the outlet end of the compression trough, and in the guide members shown at the right of Fig. 9.

As shown in Figs. 9 and 10, the trough unit 28 has secured by welding or the like on its discharge end a centrally passaged mounting plate or guide member 44 (shown in end elevation in Fig. 9) and whose central aperture is of relatively large size and corresponding in size substantially to the outlet end of the trough 28.

The upper and lower edges of said mounting and guide plate 44 are bent and doubled back as shown to form guideways 45 wherein the mounting and pressure plate 41 travels in horizontal direction. Slidable pressure and mounting plate 41 is provided with a pivotal pawl 46 which is suitably pivoted by a rivet to the forward surface thereof as shown in Fig. 10 and which limits the movement of the slidable pressure plate 41 toward the left of Fig. 10 (or toward the viewer of Fig. 9) by its releasable engagement with a projecting integral stud 47 which projects outwardly from the lower edge of the guide plate 44 as shown in Fig. 9. In the operation of the device, where the operator pulls the pressure plate 41 so that the opening to the spout device registers with the opening 42 in said pressure plate, the pawl 46, by its engagement wtih the stud 47, prevents the operator from moving said pressure plate too far and eliminates the necessity for him to pull it slowly or to take particular care in so positioning said plate. It will be apparent that when the operator desires to entirely remove the slidable "baffle" or pressure plate 41 from the machine, as for example, when cleaning the machine, he needs only to pivot upwardly the pawl 46 so that it clears the upper surface of stud 47.

The casing, usually of gelatinous or cellulosic material, is adapted to have one end slipped over the outer portions of the pressed-together spout portion 37 and hood 38, and as the compressed and preformed meat body is pressed by plunger 27 through the outlet end of the trough 17, such meat body pivots the upper hood 38 upwardly or outwardly to cause the end parts of the casing to be gripped from the inside and held in open position as the meat body is pushed thereinto.

Referring to Figs. 1 and 2, numeral 49 designates a metal shelf bracket of right-angled cross section and which has its elongated side section secured by bolts 50 to the inner depending apron 10c of the work table frame. Said mounting bracket 49 has two horizontally extending shelf portions 49a and 49b which aid in supporting the control valves herein described.

The three-way valve 51 controls the compressed air circuit to the ends of inclined cylinder 20. 52 designates an air inlet conduit connected to a compressed air source with branches at a suitable T fitted to form conduit sections 52a and 52b respectively. Conduit section 52c extends horizontally and downwardly and connects the forwardmost air inlet opening 87 of the cylinder 20 to the top outlet opening of control valve 51 as shown in Fig. 1. A pipe conduit 53 connects the lower outlet opening of said control valve 51 with the rearmost air port 55 shown at the right of Fig. 1. The downward opening portion of the control valve 51 extends through a suitable hole (not shown) in the horizontal portion 49a of the bracket 49 and a suitable lock nut 54 threads on said valve outlet to hold said control valve in stationary position.

Figure 11:
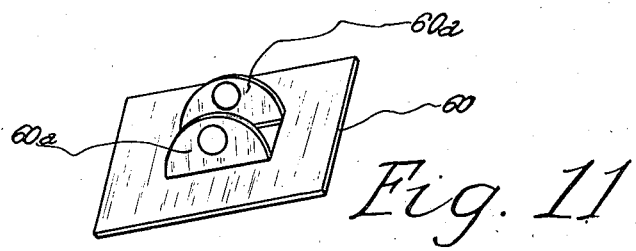
Fig. 11 is a perspective view of a metal journalling bracket, two of which are secured about lever apertures in the top strip of the device and more fully hereinafter described.

Control valve 51 has its outlet port 55 opening horizontally and to the left, as shown in Fig. 1. Said control valve is of the conventional 4-way type shown schematically in Fig. 20. Said control valve 51 has its central rotatable valve element integrally connected to and operated by a horizontally extending shaft 57 which extends to a point adjacent the depending longitudinal apron 10c. A crank arm 56 is secured on valve operating shaft 57 as shown in Fig. 2. The lower appended end of said crank arm 56 is pivotally connected by a connecting link 58 to the lower apertured end of a manually operable lever 59 by a suitable bolt or pivot as shown in Fig. 2, said manually operable lever 59 being fulcrumed in the passaged ears 60a of a suitable metal bracket 60 which is shown in perspective in Fig. 11. Said bracket 60 is secured by welding or the like on the under side of the longitudinal strip 10b of the work support and so that its apertured ears extend upwardly through a suitable hole.

It will be noted that movements in both directions of lever 59 will move the control valve element in the positions described herein to operate piston 29 in both directions.

AIR OPERATED MEANS FOR VERTICAL CYLINDER

As stated, the vertical cylinder 11 has upper air port 11a and air port 11b in its lower end. Upper air port 11a is connected by pipe conduit 12 (which is composed of a plurality of pipe sections and connecting elbows) and fits as shown to the side outlet port 63 of control valve 62 (see Fig. 1). The compressed air intake port of valve 62 is connected to conduit intake pipe 52b. The downwardly open air outlet port 64 opens into the atmosphere above the flat portion of the horizontal bracket 19.

The valve 62 is of the 3-way conventional type whose passaged valve element is connected to a horizontally extending stub shaft 65. Stub shaft 65 has a crank arm or lever 69 secured thereon which in turn has pivoted on its free end one end of a connecting link 66. Numeral 67 designates a manually operable lever which is fulcrumed in the upwardly extending ears of a suitably passaged bracket 68, which bracket is secured by welding or the like in a suitable aperture in the top strip of the table structure. The lower portion of lever 67 extends below the top strip of the table structure as indicated in Fig. 1 and is pivoted to the end of the connecting link 66. Only one of the end sections of connecting link 66 is shown in full in Fig. 2, though said link is fully shown in Fig. 1. The pivotal movement of the upper handle of lever 67 will rotate the valve element of the control valve 62 to either admit compressed air into the top of cylinder 11 through conduit 53 or to exhaust said air from said cylinder through conduit 12a and out through the air outlet port of said control valve.

Referring to Fig. 1, the lower end of the compressed air inlet pipe 52a is preferably provided with a manually operable hand valve 85 to selectively close the compressed air source from the machine when not in use.

Advantageous features of my pressing machine are the novel structural parts which are so made as to permit relatively quick disassembly and reassembly of those parts of the machine which contact the material being pressed, this permitting frequent, and daily if necessary, disassembly and cleaning to maintain the machine in an absolute clean and sanitary condition. The entire unit in which both the lateral and lengthwise pressing takes place and which is shown in Figs. 5, 6, and 9, as well as the slidable member and attached spout shown in Fig. 10, is mounted so that they may be almost instantaneously removed and replaced when cleaned.

As stated, the stud 30, shown at the left of Figs. 6 and 9 respectively, is during assembly inserted into a suitable aperture in a transversely extending metal bar 70 shown in cross section in Figs. 1, 3, and 9 and in top plan of Fig. 17. The lower end of the chute or trough 28 is provided with a downwardly depending passaged lug 71 as clearly shown in Fig. 9. Said lug 71 is releasably mounted as hereafter described.

As is shown in Figs. 17 and 19, a suitable manually retractable locking device is mounted upon the inner surface of the end panel or apron 10d adjacent the outlet end of the device, said locking device being adapted to releasably secure said compression trough and attached parts in normal working position. Said locking device consists of an angular metal substantially U-shaped bracket 72 which is provided with an intermediate passaged member 73, the end portions of said bracket likewise having apertures in alignment with the passage in the intermediate member 73. A pin 74 is slidably mounted in said aligned apertures or openings, said pin preferably having its outer end bent angularly to provide a convenient handle. Pin 74 has mounted on its intermediate portion a washer 75 and a suitable expansion spring 76 is mounted about pin 74 between washer 75 and one end of said bracket. It will be apparent that withdrawal or retraction of pin 74 will retract said pin to entirely clear the recess between intermediate member 73 and the nearest adjacent laterally projecting portion of bracket 72 to permit placement into said recess of a passaged stud 71, whereupon the operator releases pin 74 to cause the pin 74 to project itself through the opening in stud 71 and through the opening in the laterally projecting portion of bracket 72, thereby releasably securing said compression trough and connected parts in operating position.

I desire it to be understood that when it is proposed to remove the compression trough and connected parts as illustrated in Fig. 9 from the machine, that the plunger 27 is rotated to unscrew said plunger from the end of the piston rod 26, whereupon the outlet end of trough member 28 is lifted and the end of the trough is slipped off said piston rod almost simultaneously with withdrawal of the stud 30 from the opening in the transverse metal bar 70.

In Fig. 2 I have shown a top plan view of my pressing machine with the lower longitudinal flat top strip 10b broken away, and showing the upper flat top strip 10a in top plan view. In order to provide convenient cleanable sanitary working surfaces capable of being relatively easily removed and cleaned, and in order to cover the hereinbefore described operating parts of the machine, I provide said metal panels or strips which are quickly mountable and dismountable from the machine. Referring to Figs. 16 and 17, reference numeral 77 designates a substantially rectangular metal panel having upwardly raised peripheral flanges 78 which preferably incline upwardly and outwardly, and are thence bent downwardly to form integral reinforcing flanges. Said rectangular panel 77 is preferably though not necessarily removably secured by a plurality of screws 79, one of which is shown in Fig. 16, and which pass through suitable apertures in the downwardly extending side flanges 78 of said panel 77 and engage in suitably spaced threaded apertures (not shown) formed in each of the vertically extending and depending side aprons 10c.

Suitable substantially flat metal panels 80 are removably mounted upon the remainder of the two horizontal top strips 10a and 10b and on opposite sides respectively of the upper portions of the compression trough 28 and its longitudinal flanges, one of said panels being shown in side elevation in Fig. 16. Said two metal panels 80 may be secured by suitable screws 81, one of which is shown in Fig. 16 and which engage threaded apertures (not shown) in the vertical side aprons 10c of the table structure. Said respective panels form means to protect the parts below same from meat particles and undesirable matter and form a conveniently cleanable working surface over the main portion of my pressing machine, leaving exposed the trough member 28 and those parts beyond the outlet end of the table structure.

In Figs. 1, 2, 16 and 17 are illustrated at the left hand end of each thereof a fragment of a flat metal shelf 82 which is supported by a pair of suitable diagonally extending braces 83, only a fragment of which is shown at the left of Figs. 1 and 16. Said braces 83 have their lower ends formed with suitable bosses spaced from said lower ends so that said lower brace ends may be inserted into suitable apertures formed in the lower ends of the two legs 10f, and the upper ends of said braces engage the corner junctures of suitable downwardly extending projections or lugs (not shown) formed on the lower surface of said shelf 82. The end of shelf 82 is removably mounted upon the end apron 10d by a pair of screws 84 which pass through apertures of the downwardly bent end of shelf 82 and thread into suitably spaced threaded apertures in said end of apron 10d.

Description of operation

In normal non-operating position the piston 25, plunger 27 and connecting piston rod 26 are in retracted position, said plunger being illustrated in Fig. 9. The bail 16 is in its normal inoperative uppermost position in which it is held by the springs 17, and the compression plate 31 is open and pivoted upwardly on its hinge connection and extending in an upwardly and inclined direction. In said inoperative position the handle 59 is in a position so that the forward portion of the chamber of cylinder 20 in front of piston 25 is communicated through conduit and control valve 51 and conduit 52a to the compressed air source, which compressed air source is usually connected to end valve 85 and conduit 52 by suitable rubber hose (not shown).

A mass of meat or other compressible product is placed by the operator into the deepest portion of trough 28, and the compression plate 31 is pivoted down and lowered upon said meat, and then the bail 16 will be moved to the position upon the handle 34a and in engagement with the recess in the manner hereafter described.

The operator thereupon moves the handle 67 out of the position shown in Fig. 1 and to open control valve 62 to admit compressed air through said valve and through conduit 12a and into the top of the vertical cylinder 11 to thereby move said cylinder downward and to its lower limit against the normal action of springs 17 and 17a. This downward movement causes the surface of the offset intermediate portions of the bail to slide against transversely extending studs 86, shown in Fig. 13, to cause the upper part of said bail to pivot in the direction of the pressure plate and thereby causes the upper end of the bail to rest in the recess 34b of handle 34a. This presses the compression plate 31 against the mass of meat to impart lateral and inward pressure against such mass of meat. This action usually elongates the meat or food mass to a length substantially greater than the length of the ham or meat body to be finally formed. I desire it to be understood that certain kinds of food or other materials are of a nature not requiring power means to compress the same to the desired degree. As to such materials, the operator may merely depress the compression plate 31 by hand, and if desirable, cause the same to be either manually or otherwise held down while the compressing and ejecting plunger in the trough member is selectively operated to either eject the mass compressed by the pressure plate 31, or to both additionally compress the mass from a longitudinal direction plus eject the same in the hereindescribed manner.

Thereupon, while the pressure plate 31 is held down, either manually or by power means through bail 16, the operator moves the slidable plate 41 into position where its flat non-passaged portion obstructs the outlet of the trough or chute 28, and thereupon he grips handle 59 and pivots its lever to open the control valve 51 in such a manner to communicate the compressed air source through conduit 52a and through conduit 53 with the interior of cylinder 20 so that piston 25 is moved partially to the left of Fig. 1, and likewise the plunger 27 moves and compresses the meat or food body into the substantially cylindrical chamber adjacent the outlet end of said trough, the ends of said meat body being thereby compressed by pressure imparted by plunger 27. In this optional compression step, the outermost end of the meat body is pressed against the flat end of plate 41 so that both the ends of the compressed meat body are substantially flattened and the entire mass of compressed material is therefore simultaneously compressed longitudinally as well as inwardly and transversely. The step of longitudinal compression is used only in cases where the degree of the pressed-together state of the finished product requires it, i. e. so-called pressed hams. In instances of food or other materials requiring lesser degree of compression, the application of longitudinal pressure applied through plunger 27 is not necessary, and in these instances the material compressed by the pressure plate is ejected from the trough into a casing or container.

Thereupon the operator moves lever 59 to open valve 51 to close the outlet of the valve which is communicated to the compressed air source through conduit 52a and simultaneously opens said control valve 51 to exhaust the compressed air behind piston 25 to atmospheric pressure. Thereupon, the longitudinal and projecting pressure against the ham having been released, the operator grips handle 43 and slides the plate 41 and the surrounding spout and hood, whereupon the operator slips one end of a meat or food container, for example a gelatinous tube-like casing, over the outer ends of the spout 37 and hood 38 in the manner hereindescribed and also described in my co-pending application, Serial No. 376,977.

Thereupon the operator again grips handle 59 and moves the fulcrumed lever to again admit compressed air through control valve 51 to the chamber within cylinder 20 to cause outward and upward movement of piston 25 and to cause outward movement and projection of plunger 27 into and through the outlet opening in the end of the machine and also into the chamber defined by hood 38 and spout 37. This causes the ham or other compressed body of material to be projected through the outlet end of the trough while under pressure of the compression plate 31, and causing such projected compressed body to be projected into and through the chamber defined by the spout 37 and hood 38 and into the casing or container in which the meat or other food material is to be contained and marketed.

The operator then retracts the plunger from its outermost position beneath hood 38 by moving handle 59 to move control valve 51 to exhaust the air through said valve from behind piston 25 and to simultaneously admit compressed air into the forward part of cylinder 20 to cause retraction of said cylinder 25 and plunger 27. The unit is thereupon ready for a repetition of the operation.

I desire it to be understood that while I have described one preferred form of my invention used with reference to ham or similar bodies, that my device is satisfactorily usable for many other materials or combinations of materials, either edible or otherwise, which are capable of being compressed in order to be put into a marketable state.

I am aware that various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof.

I claim as my invention:

1. In an apparatus for pressing pieces of food into a body of desired shape, a longitudinally recessed supporting work surface element, a substantially semi-cylindrical trough removably mounted in said recess, a compression cover having a lower surface opposed to said trough and being removably and pivotally mounted at one end; the inner opposed surfaces of said trough and said cover being of a shape similar to the food body shape desired; manually controlled air-operated mechanism for selectively depressing said cover in the direction of said trough; an expansible spout mounted at the discharge end of said trough; said spout being adapted to temporarily hold an open ended container; and manually controlled air operated mechanism including a selectively actuable slidable plunger and an air cylinder and air-driven piston therein connected to said plunger; said last mentioned mechanism being adapted to eject the formed meat body from said trough, thru said spout and into a container held on said spout.

2. An apparatus for forming a food body to desired shape; a supported work platform bifurcated longitudinally at one end thereof; a substantially semi-cylindrical trough mounted in inclined position and partially within said bifurcation; a pressure plate pivotally mounted to move toward and away from said trough, the depression of said pressure plate being adapted to normally press the food material to desired form; a metal bail pivoted below said trough and adapted to depress said pressure plate; a compressed air-operated piston and piston rod mounted below said trough; and a connection element between the outer end of said air operated piston rod and said bail whereby downward movement of said piston rod depresses said pressure plate to cause the food material to be pressed between said pressure plate and said trough, and spring means for normally returning said bail to upper position.

3. An apparatus for forming a food body to desired shape and for inserting such body within a substantially tubular covering; a supported work platform; a substantially semi-cylindrical trough mounted in inclined position and extending partially thru said work platform; a pressure plate movably and pivotally mounted to move toward and away from said trough, the depression of said pressure plate being adapted to normally press the food material to desired form; a metal connecting link member pivoted below said trough and adapted to removably engage and depress said pressure plate; a compressed air-operated and manually controlled piston and piston rod mounted below said trough; a connection element between said piston rod and said connecting link member whereby downward movement of said piston rod depresses said pressure plate to cause the food material to be pressed between said pressure plate and said trough; a plunger slidably mounted in said trough; and manually controllable air operated mechanism for reciprocating said piston, the projection of said plunger being adapted to push the pressed meat body through and from said trough.

4. An apparatus for forming a food body to desired shape and for inserting such body within a substantially tubular covering; a supported work platform; a substantially semi-cylindrical trough mounted in inclined position and extending partially thru said work platform; a pressure plate movably and pivotally mounted to move toward and away from said trough, the depression of said pressure plate being adapted to normally press the food material to desired form; a metal connecting link member pivoted below said trough and adapted to removably engage and depress said pressure plate; a power operated and manually controlled piston and piston rod mounted below said trough; a connection element between said piston rod and said connecting link member whereby downward movement of said piston rod depresses said pressure plate to cause the food material to be pressed between said pressure plate and said trough; a piston slidably mounted in said trough; manually controllable mechanism for reciprocating said piston, the projection of said piston being adapted to push the pressed meat body through and from said trough; and a holding spout mounted at the discharge end of said trough adapted to hold an open ended receptacle as a formed meat body is ejected from said trough and pushed into said receptacle.

5. In a device for pressing together meat or the like to desired forms and for inserting the same within an open ended cover; a platform having an enlarged passage therethrough; a substantially semi-circular trough mounted to extend partially thru said passage; a pressure plate releasably and movably mounted to move to and away from said trough; a compressed air cylinder mounted below said platform; air conduits whereby said cylinder is connectable to a compressed air source; a reciprocal piston and piston mounted rod below said platform; manually operable valve means in said conduits to provide for admitting air to said cylinder and exhausting said air therefrom the entry of compressed air into said cylinder being adapted to lower said piston and piston rod; a releasable connecting member connecting the upper portion of said pressure plate and said piston rod whereby downward projection of said last mentioned piston rod will depress said pressure plate to compress a meat or food body between said pressure plate and said trough; and a selectively and independently operable mechanism including a pusher element slidable in said trough and adapted, when projected into said trough, to eject a formed body of meat or the like from said trough.

6. In a ham pressing and packaging machine; a passaged base member; a trough mounted in inclined position in the passage of said base member and extending thereabove at its outlet end; a movable compression plate pivotally mounted to move toward and away from said trough, the pressing together movement of said compression plate being adapted to compress a yieldable food into desired form; manually controlled air-operated mechanism adapted to pull said compression plate downwardly, said mechanism including a pivotally mounted link member adapted to releasably engage said compression plate; and spring means for returning said link member and compression plate to upper releasable position.

7. A device for compressing food into bodies of desired form comprising a trough member having an open outlet end; an end mounting plate having an opening therethrough and slidably mounted to selectively close the outlet end of said trough member; a pivoted pressure plate; means for selectively pressing said plate against a food mass within said trough member comprising a cylinder, air conduits for connecting the opposite ends of said cylinder to a compressed air source, a piston and piston rod slidably mounted in said cylinder, a cross arm on the outer end of said piston rod, and a bail-like member connected to said cross arm and adapted to depress said pressure plate; a plunger mounted to reciprocate in said trough member and for imparting pressure against an end of the food mass within said trough to thereby compress the food mass longitudinally between said plunger and said end mounting plate; and means for selectively reciprocating said plunger within said trough to selectively exert said longitudinal pressure; the projecting movement of said plunger being adapted, when said mounting plate is in position of not obstructing said trough outlet to selectively eject a compressed food mass from said trough and through its outlet end.

8. In a device for pressing together meat to desired forms and for inserting the same within an open ended cover; a supporting element providing a flat platform having an enlarged longitudinal passage therein and a passaged end plate disposed vertically across the end of said platform; a passaged mounting plate slidably mounted on said end plate and adapted to selectively close said end plate passage in certain positions; a substantially semi-cylindrical trough mounted in said platform passage and depending therebelow; a plunger slidably mounted in said trough; manually controlled mechanism for selectively reciprocating said plunger, said plunger being adapted to eject a formed meat body from said trough; a pressure plate releasably and movably mounted above said trough and adapted to move substantially vertically in said trough; a cylinder mounted below said platform; a reciprocable piston and piston rod mounted below said platform; a manually controlled air-controlling mechanism for admitting compressed air to said cylinder and exhausting compressed air therefrom for selectively reciprocating said piston and piston rod; a metal connection member pivotally connected to said piston rod and having an upper end for releasably engaging the upper portion of said pressure plate, whereby downward projection of said last mentioned piston rod will depress said pressure plate; and a spring connected at one end to said platform and at its other end to said metal connection member and adapted to pivot said connection member in a direction to release said pressure plate to permit the removal of said pressure plate from said trough.

9. In a device for pressing together meat or the like to desired forms and for inserting the same within an open ended cover; a platform having an enlarged longitudinally extending passage therethrough; a substantially semi-circular trough mounted to extend partially through and below said passage; a passaged mounting plate slidably mounted on the end of said platform and adapted to obstruct the outlet end of said trough in certain positions thereof; a pressure plate of substantially arcuate cross section removably and pivotally connected at one end to said platform and movably mounted to move to and away from said trough; a cylinder mounted below said platform; a reciprocal piston and piston rod mounted below said platform; manually actuable means including conduits and valves for admitting compressed air to said cylinder and for exhausting same to thereby selectively reciprocate said piston and piston rod; a releasable connecting member connecting the upper portion of said pressure plate and said piston rod whereby downward projection of said last mentioned piston rod will depress said pressure plate to compress a meat or food body between said pressure plate and said trough; a plunger mounted for slidable movement in said trough; and manually controlled mechanism operatively connected to said plunger for selectively projecting and retracting said plunger, said plunger being adapted to eject a pressed food body from said trough.

10. In a ham pressing and packaging machine; a passaged base member; a semi-cylindrical trough removably mounted in inclined position in the passage of said base member and extending thereabove adjacent its outlet end; a passaged end plate slidably mounted on said base member and adapted, in certain positions, to obstruct the outlet end of said trough; knuckles on said base member adjacent the outlet end of said trough; a movable compression plate removably pivoted at one of its ends on said knuckles and adapted to move into and out of said trough; mechanism for selectively and optionally pulling down said compression plate into said trough, the pressing movement of said compression plate being adapted to laterally compress a yieldable food mass in said trough into desired form; a manually controlled plunger mounted to slide in said trough, means for projecting and retracting said piston, said means including a compressed air cylinder; conduit connections therefor; operable valves in said conduit connections; a piston in said cylinder and a piston rod connecting said piston and said plunger, said plunger being adapted, upon projecting movement, to either press a meat body longitudinally against said end plate when said end plate obstructs said trough outlet or to push a pre-formed meat or food unit along said trough and outwardly therefrom.

11. An apparatus for forming a yieldable food body to desired shape and for inserting said body into a covering comprising, in combination, a trough, the bottom and a portion of the sides of which are shaped to that form desired to be imparted to the lower half of the food body; a trough cover, pivotally mounted at one end, the lowermost surface of which cover is shaped to that form desired to be imparted to the upper half of the food body; means for applying downward pressure on that end of the trough cover opposite its pivoted end; comprising a substantially vertically disposed air cylinder; conduits adapted to communicate the opposite ends of said cylinder with a compressed air source; selectively operable valves in said conduits; a piston slidable in said vertically disposed cylinder; a connecting rod connected to said piston and a connecting member for transmitting the piston movement to said trough cover; means including a selectively actuable plunger adapted to force the food body in the trough longitudinally thereof in the direction of a discharge port; and a discharge means for receiving and temporarily retaining the open end of a covering, said discharge means permitting discharge of said food body into said covering.

12. A device for compressing ham and other food bodies including a substantially rectangular supported frame structure having a horizontal work surface and having a centrally passaged end panel; a trough member having an end opening in registry with the opening of said end panel and having an inclined bottom; an apertured end plate on the end of said trough and having upper and lower opposed parallel inwardly opening guide flanges thereon; a baffle plate slidably mounted in said guide flanges, said plate having an opening in one end portion thereof and being selectively movable to either register its opening with the opening in said end panel or to obstruct said opening; a spring-pressed manually retractable locking means mounted on the frame end panel below said trough; an apertured lug depending from said trough and adapted to be engaged by said locking means to thereby hold said trough in position; a pressure plate pivotally mounted at one end thereof above the outlet end of said trough; an upwardly extending handle member on said pressure plate; manually controlled compressed air-operated mechanism mounted on said frame including a vertically extending cylinder, piston and piston rod; means for transmitting the movement of said piston and piston rod to depress said pressure plate against a food mass in said trough; a plunger slidably mounted in said trough member, and mechanism for selectively moving said plunger to compress the food between it and said first mentioned slidable baffle plate and for selectively moving said plunger through said trough to eject the food mass therefrom and through said opening of said slidable mounting plate.

JOHN OPIE.